United States Patent
Blakemore et al.

(10) Patent No.: US 6,607,214 B2
(45) Date of Patent: Aug. 19, 2003

(54) GAS GENERATION VIA INDIRECT IGNITION

(75) Inventors: David L. Blakemore, Roy, UT (US); Anthony M. Young, Brigham City, UT (US); David J. Green, Brigham City, UT (US); Karl K. Rink, Liberty, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/932,709

(22) Filed: Aug. 17, 2001

(65) Prior Publication Data

US 2003/0034642 A1 Feb. 20, 2003

(51) Int. Cl.[7] .............................................. B60R 21/26
(52) U.S. Cl. ....................................... 280/741; 102/531
(58) Field of Search ................................. 280/741, 737, 280/736, 740; 102/530, 531, 702; 222/3

(56) References Cited

U.S. PATENT DOCUMENTS

| | | | |
|---|---|---|---|
| 3,773,352 A | | 11/1973 | Radke |
| 3,791,302 A | * | 2/1974 | McLeod ..................... 102/201 |
| 3,905,515 A | | 9/1975 | Allemann |
| 3,961,806 A | | 6/1976 | Katter |
| 4,899,663 A | | 2/1990 | Thorn |
| 4,917,017 A | | 4/1990 | Beltz |
| 5,022,674 A | | 6/1991 | Frantom et al. |
| 5,031,932 A | | 7/1991 | Frantom et al. |
| 5,092,237 A | * | 3/1992 | Beaufay et al. ............. 102/531 |
| 5,219,178 A | | 6/1993 | Kobari et al. |
| 5,230,531 A | * | 7/1993 | Hamilton et al. ........... 280/737 |
| 5,273,312 A | * | 12/1993 | Coultas et al. .............. 280/737 |
| 5,346,254 A | | 9/1994 | Esterberg |
| 5,351,988 A | | 10/1994 | Bishop et al. |
| 5,494,312 A | * | 2/1996 | Rink .......................... 280/737 |
| 5,538,278 A | | 7/1996 | Blackshire et al. |
| 5,564,743 A | | 10/1996 | Marchant |
| 5,582,428 A | | 12/1996 | Buchanan et al. |
| 5,602,361 A | * | 2/1997 | Hamilton et al. ........... 102/288 |
| 5,669,629 A | | 9/1997 | Rink |
| 5,709,406 A | * | 1/1998 | Buchanan ................... 280/737 |
| 5,750,922 A | * | 5/1998 | Seeger ........................ 149/24 |
| 5,762,368 A | * | 6/1998 | Faigle et al. ................ 280/737 |
| 5,788,270 A | | 8/1998 | HÅland et al. |
| 5,794,973 A | | 8/1998 | O'Loughlin et al. |
| 5,836,610 A | | 11/1998 | Rink et al. |
| 5,839,754 A | | 11/1998 | Schlüter et al. |
| 5,857,699 A | | 1/1999 | Rink et al. |
| 5,884,938 A | | 3/1999 | Rink et al. |
| 5,899,492 A | | 5/1999 | Okada et al. |
| 5,941,562 A | | 8/1999 | Rink et al. |
| 5,970,880 A | | 10/1999 | Perotto |
| 5,984,351 A | | 11/1999 | Pierotti et al. |
| 5,992,881 A | | 11/1999 | Faigle |
| 6,244,623 B1 | | 6/2001 | Moore et al. |

OTHER PUBLICATIONS

Muhamed Sućeska, Ph.D.: *Chapter 2.4. Sensitivity of Explosives to Mechanical Stimuli, Test Methods for Explosives,* Springer–Verlag, 21–34, 1995.

* cited by examiner

*Primary Examiner*—David R. Dunn
(74) *Attorney, Agent, or Firm*—Sally J. Brown; James D. Erickson (57) ABSTRACT

Inflation apparatuses and methods are provided wherein a supply of ignition material is indirectly ignited to assist in the inflation process.

29 Claims, 7 Drawing Sheets

GAS GENERATION VIA INDIRECT IGNITION

BACKGROUND OF THE INVENTION

This invention relates generally to gas generation and, more particularly, to the indirect ignition of igniter materials such as used in inflator devices used for providing or supplying inflation gas to inflatable passive restraint systems for use in vehicles for restraining the movement of an occupant in the event of a vehicular collision.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior.

Various types or forms of such passive restraint assemblies have been developed or tailored to provide desired vehicle occupant protection such as based on either or both the position or placement of the occupant within the vehicle and the direction or nature of the vehicle collision, for example. In particular, driver side and passenger side inflatable restraint installations have found wide usage for providing protection to drivers and front seat passengers, respectively, in the event of head-on types of vehicular collisions. Driver side and passenger side inflatable restraint installations do not, however, generally provide as great as may be desired protection against vehicular impacts inflicted or imposed from directions other than head-on, i.e., "side impacts." In view thereof, substantial efforts have been directed to developing inflatable restraint installations having particular effectiveness in the event of a side impact.

Upon deployment, the time period during which an airbag cushion remains pressurized is commonly referred to as "stand-up time." In practice, driver side and passenger side airbag cushions are typically desirably designed to begin deflating almost instantaneously upon deployment such as to avoid presenting an undesirably hard or ungiving surface to an oppositely situated vehicle occupant. However, airbag cushions which provide substantially longer stand-up times may be required or desired in the event of certain accidents or collisions in order to provide a suitable desired level of occupant protection. For example, one particularly troublesome form of side impact is commonly referred to as a "roll-over." In a roll-over incident, a vehicle may undergo a partial or complete roll-over or may undergo multiple roll-overs. As will be appreciated by those skilled in the art, roll-over accidents can be particularly demanding on inflatable restraint systems. In particular, an airbag cushion designed to provide occupant protection in the event of a vehicle roll-over may be required or desired to remain pressurized for an extended or prolonged period of time, as compared to usual or typical driver side and passenger side airbag installations. For example, a roll-over protection side impact airbag cushion desirably remains pressurized or provides a stand-up time as long as about 5 seconds and, in some applications, a stand-up time of nearly 7 seconds.

One particularly effective form of side impact inflatable restraint is the subject of HÅland et al., U.S. Pat. No. 5,788,270, issued Aug. 4, 1998, the disclosure of which patent is hereby incorporated by reference herein in its entirety and made a part hereof. Inflatable elements, such as disclosed in HÅland et al., U.S. Pat. No. 5,788,270, may desirably include an inflatable portion formed from two layers of fabric with the front layer and the back layer of the fabric woven together at selected points. In particular embodiments, such selected points are arranged in vertically extending columns and serve to divide the inflatable part into a plurality of vertical parallel chambers. The spaces between the selected points permit internal venting between adjacent chambers of the inflatable element. Particular such inflatable devices/elements, such as utilized in applications to provide protection over an extended area and having a generally planar form, are frequently referred to as "inflatable curtains."

Many types of inflator devices have been disclosed in the art for use in the inflating of one or more inflatable restraint system airbag cushions. Known types of inflator devices include inflators known as "blow down" inflators and "reverse flow" inflators. In a blow down inflation system, a pyrotechnic or other selected material is commonly burned to create a build-up of pressure within a compressed gas storage chamber such as to result in the rupture or release of inflation gas therefrom when the internal pressure reaches a predetermined level or range. Thus, in blow down inflator devices, the opening or rupture of a seal, burst disk or the like within the inflator typically results or produces a flow of heated or elevated temperature inflation gas from the device and into an associated airbag cushion. While blow down inflation systems can desirably be of relatively lower cost and complexity, such systems can result in the delivery of inflation gas to an associated airbag cushion at a higher temperature, pressure and/or mass flow rate than may otherwise be desired.

In "reverse flow" inflator devices, the actuating initiator and the openings wherethough the inflation gas exits from the inflator device are typically at or along the same end or side of the inflator device. Thus, in typical reverse flow inflators, the initial inflation gas exiting from the inflator device and into an associated airbag cushion is relatively cool and is later followed by heated or elevated temperature inflation gas. Consequently, reverse flow inflators which initially provide or supply a relatively cool inflation gas, followed by heated or elevated temperature inflation gas to an associated airbag cushion, can typically more easily provide or result in the more gradual deployment of the associated airbag cushion, as may be desired in particular deployment applications.

In inflatable passive restraint system design, the space requirement (commonly referred to as the "envelope") for the airbag inflator is commonly very important. The need for airbag inflators with smaller envelopes can be particularly crucial for applications involving inflation of restraint elements such as inflatable curtains. In particular, inflatable curtain cushions tend to have rather large inflation volumes while market needs, dictated at least in part by available packaging volumes, call for inflators characterized by relatively small volumes. For example, some common inflatable curtain airbag cushions have inflation volumes of up to 40 liters while an inflator envelope of no larger than about 30 mm in diameter and 400 mm in length is permitted.

One approach to satisfying the need and demand for smaller sized inflator devices capable of providing relatively large volumes of inflation gas is via the use of liquified gases such as disclosed in commonly assigned Rink, U.S. Pat. No. 5,669,629, issued Sep. 23, 1997; Rink et al., U.S. Pat. No. 5,884,938, issued Mar. 23, 1999; and Rink et al., U.S. Pat. No. 5,941,562, issued Aug. 24, 1999, for example and the disclosures of which patents are hereby incorporated by reference herein in their entirety and made a part hereof. In such an approach, the increased density of liquified gases (as compared to similar gaseous phase systems) permits the storage of a much greater mass of material in an identical volume.

The heating and/or dissociation of such stored liquids can, however, be problematic. For example, it has been found generally difficult to design reverse flow inflators such that heating and/or dissociation occurs to the desired or required extent as the diameter of the inflator gets smaller and smaller. In particular, it is generally difficult and costly to design hardware and components that are capable of producing and effectively distributing heat through such stored volumes of liquid. For example, for those inflator devices which rely on dissociation of a stored fluid such as nitrous oxide, as the length to diameter ratio (L/D ratio) for the inflator fluid storage chamber increases, it is frequently increasingly difficult to obtain heat penetration into the stored nitrous oxide fluid to the extent desired to more fully or completely realize dissociation of the nitrous oxide. Further, blow down inflators are generally less practical in such applications due to extremely high operating pressures and rise rates.

Thus, there is a need and a demand for alternative airbag inflator device ignition schemes and, in particular, there is a need and a demand for an apparatus for inflating an inflatable device as well as a method for supplying a quantity of inflation gas to an inflatable device which provides or results in improved heat transmission to stored gas source material (s) without necessitating undesirably costly design modifications or component inclusions.

SUMMARY OF THE INVENTION

A general object of the invention is to provide an improved apparatus for inflating an inflatable device as well as an improved method for supplying a quantity of inflation gas to an inflatable device.

A more specific objective of the invention is to overcome one or more of the problems described above.

The general object of the invention can be attained, at least in part, through an apparatus for inflating an inflatable device which includes a fluid storage chamber, a chamber opener and a first indirect ignition charge. In accordance with one embodiment of the invention, the fluid storage chamber has contents which, in a static state, include a supply of at least one gas source material and which at least one gas source material has a fluid form. The chamber opener is effective, upon actuation, to open the fluid storage chamber and release therefrom a quantity of inflation gas derived from at least a portion of the at least one gas source material. The first indirect ignition charge includes at least one first ignition material physically remote from the chamber opener and in indirect ignition contact therewith. As described in greater detail below relative to such an apparatus, actuation of the chamber opener results in subsequent indirect ignition of at least a portion of the first indirect ignition charge to produce a quantity of heat and with at least a portion of the quantity of heat being transmitted to the contents of the fluid storage chamber.

The prior art generally fails to provide inflator devices and methods for supplying inflation gas to an inflatable device in a manner which effectively and efficiently transmits heat to stored gas source material(s) without necessitating undesirably costly design modifications or component inclusions.

The invention further comprehends a method of supplying a quantity of inflation gas to an inflatable device. In accordance with one preferred embodiment of the invention, an apparatus which includes a fluid storage chamber, a chamber opener, and at least one indirect ignition charge, the fluid storage chamber having contents, in a static state, including a supply of at least one gas source material, the at least one gas source material having a fluid form, is employed. Further, such method involves actuating the chamber opener and indirectly igniting at least a portion of the at least one indirect ignition charge to produce heat to heat at least a portion of the supply of the at least one gas source material.

As used herein, references to "combustion," "combustion reactions" and the like are to be understood to generally refer to the exothermic reaction of a fuel with an oxidant.

As used herein, references to "dissociation," "dissociation reactions" and the like are to be understood to refer to the dissociation, splitting, decomposition or fragmentation of a single molecular species into two or more entities.

"Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure change the energy which may be required for the dissociation reaction to be completed, such dissociation reactions remain primarily temperature controlled.

An "exothermic thermal dissociation" is a thermal dissociation which liberates heat.

"Equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi = (F/O)_A / (F/O)_S \qquad (1)$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

References to the detection or sensing of "occupant presence" are to be understood to refer to and include detection and/or sensing of size, weight, and/or position of an occupant under consideration.

References to inflator or inflation gas "output" are to be understood to refer to inflator performance output parameters such as the quantity, supply, and rate of supply of inflation gas. With "adaptive output inflators," the inflator output is generally dependent on selected operating conditions such as ambient temperature, occupant presence, seat belt usage and rate of deceleration of the motor vehicle, for example.

A "pyrotechnic" material, in its simplest form, consists of an oxidizing agent and a fuel that produce an exothermic, self-sustaining reaction when heated to the ignition temperature thereof.

As used herein, the term "indirect ignition", as used in reference to the ignition of a pyrotechnic or the like material, can be generally thought of as an ignition ultimately resulting from transfer of, at least part of, the energy of a shock or pressure wave into the material. It is thought that during such transfer of energy to the material, small locations of intense heating, sometimes referred to as "hot spots" occur, causing or resulting in the ignition. Thus, as used herein, indirect ignition, also sometimes referred to as "sympathetic ignition" neither requires nor relies on particle impingement to effect the ignition of a spaced apart or otherwise isolated charge of ignition material.

Other objects and advantages will be apparent to those skilled in the art from the following detailed description taken in conjunction with the appended claims and drawings.

DETAILED DESCRIPTION OF THE INVENTION

Figure 1:
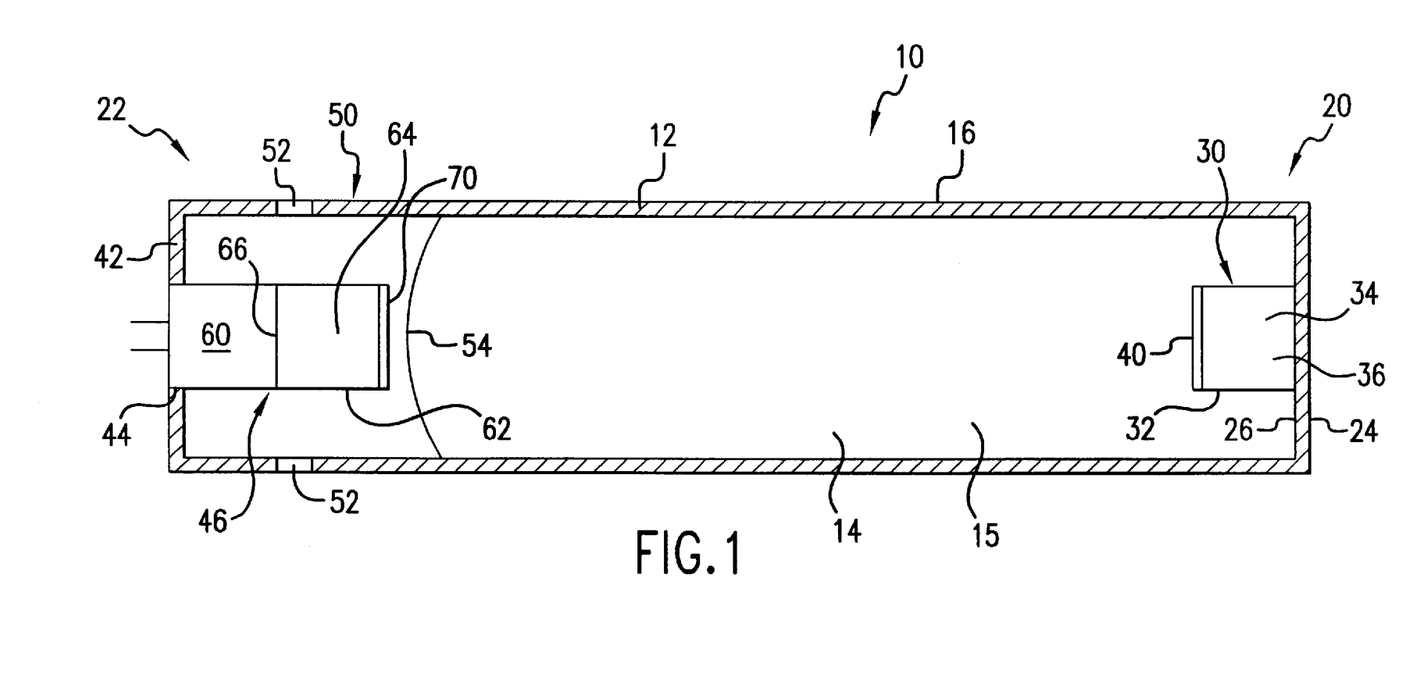
FIG. 1 is a simplified, partially in section, schematic drawing of an airbag inflator in accordance with one embodiment of the invention.

The present invention provides, as detailed below, an improved apparatus for inflating an inflatable device as well as an improved method for supplying a quantity of inflation gas to an inflatable device. The invention may be embodied in a variety of different structures. Referring initially to FIG. 1, there is illustrated an apparatus for inflating an inflatable device, also sometimes referred to hereinafter as an "airbag inflator assembly", generally designated by the reference numeral 10, in accordance with one preferred embodiment of the invention and such as may be used to inflate an inflatable vehicle occupant restraint, e.g., an inflatable airbag cushion, (not shown). As is known and upon proper actuation, such inflatable vehicle occupant restraints are typically inflated by a flow of an inflation fluid, e.g., gas, from an inflator assembly to restrain movement of an occupant of the vehicle. In practice, it is common that the inflatable vehicle occupant restraints be designed to inflate into a location within the vehicle between the occupant and certain parts of the vehicle interior, such as the doors, steering wheel, instrument panel or the like, to prevent or avoid the occupant from forcibly striking such parts of the vehicle interior.

The invention is described hereinafter with particular reference to an inflator for use in various automotive vehicles including vans, pick-up trucks, and particularly automobiles. As will be appreciated by those skilled in the art, the invention has applicability to various types or kinds of inflation applications such as airbag installations for automotive vehicles including driver side, passenger side and side impact airbag assemblies, for example. Moreover, the invention has applicability with other types of vehicles as well, including airplanes, for example.

The inflator assembly 10 comprises a pressure vessel 12 including a chamber 14. The chamber 14 is elongated in that it desirably has a length to diameter ratio (L/D ratio) of at least 5 and such as may be desired for the more effective inflation of various elongated inflatable devices such as at least certain inflatable curtain inflatable devices. Those skilled in the art will appreciate that inflator devices of relatively small diameter (e.g., inflators with diameters of less than 30 mm, preferably inflators with diameters of less than 25 mm and, even more preferably, inflators with diameters of less than 20 mm) and suitably large L/D ratios desirably permit and facilitate assemblies wherein such inflator assembly is contained in whole or in part within an associated inflatable device, such as an inflatable device in the form of an inflatable curtain airbag cushion. Also, the inflator assembly 10 may desirably be small enough, e.g., have a diameter small enough, that the installation or placement thereof in particular locations within the interior of a vehicle, such as along the roof line of a vehicle such as above a vehicle door, is facilitated.

The chamber 14 contains a fluid load, designated by the reference numeral 15 and which, as described in greater detail below, includes a gas source material. In view thereof, the chamber 14 is sometimes hereinafter referred to as "a fluid storage chamber." As will be appreciated, such a fluid load can be stored in a gaseous, liquid or multi-phase form (i.e., partially gaseous and partially liquid mixture). However, the premium on size generally placed in modern vehicle design has generally resulted in a preference for smaller sized airbag inflators. In view thereof and the fact that the densities for suitable gas source materials are significantly greater when in a liquid, rather than gaseous form, storage of such gas source materials primarily in a liquid form will typically be preferred.

Inflator assemblies in accordance with the invention can desirably be formed or constructed to hold or contain various suitable gas source material fluid loads. Thus, in accordance with particular preferred embodiments of the invention, suitable gas source materials for use in the practice of the invention include various gases or liquified gases which are inert or are generally unreactive under the conditions of operation. Examples of such gas source materials include but are not necessarily limited to argon, helium, carbon dioxide and mixtures thereof. Other suitable gas source materials for use in the practice of the invention include various dissociative gas source materials such as disclosed in the above-identified, commonly assigned Rink, U.S. Pat. No. 5,669,629, issued Sep. 23, 1997; Rink et al., U.S. Pat. No. 5,884,938, issued Mar. 23, 1999; and Rink et al., U.S. Pat. No. 5,941,562, issued Aug. 24, 1999, the disclosures of which patents are expressly incorporated herein in their entirety. As disclosed in Rink, U.S. Pat. No.

5,669,629, a wide variety of gas source materials which undergo dissociative or decompositional reactions, preferably an exothermic such reaction, to form gaseous products are available. Such gas source materials include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

Generally, dissociative gas source materials used in the practice of the invention are preferably:

a.) non-toxic and non-corrosive both in the pre- and post-dissociation states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the dissociation reaction, and which catalysts may be difficult to remove or handle; and d.) form products of dissociation which do not contain undesirable levels of undesirable species, such as carbonaceous material (e.g., soot), $CO_x$, $NO_x$, $NH_3$, for example.

A currently preferred dissociative gas source material for use in the practice of the invention is nitrous oxide ($N_2O$). Nitrous oxide is advantageously generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns. Further, in accordance with the chemical reaction (2) identified below, the dissociation products produced or formed upon the dissociation of nitrous oxide ideally are nitrogen and oxygen:

$$2N_2O = 2N_2 + O_2 \qquad (2)$$

Thus, not only does such reaction form products which are generally non-toxic and non-corrosive but also results in the production or formation of molecular oxygen. As will be appreciated, such oxygen may then be available for subsequent reaction such as may result in further or enhanced inflation gas production or formation.

It is to be understood that such nitrous oxide can be stored in a gaseous, liquid or multi-phase form (i.e., partially gaseous and partially liquid mixture), as may be desired in particular applications or installations. In view of the above-identified general preference for smaller sized airbag inflators and the fact that the density of nitrous oxide is significantly greater when in a liquid, rather than gaseous form, one preferred embodiment of the invention involves storage of nitrous oxide primarily in a liquid form.

It is also to be understood that while such nitrous oxide dissociative gas source material can be contained within the inflator storage chamber in a pure form (e.g., such that the chamber contents include no more than minor levels of other materials, such as air as may be present in the dissociative chamber prior to being filled with the dissociative gas source material), it may be preferred to include an inert gas therewith. For example, an inert gas such as helium can be included with nitrous oxide to facilitate leak checking of the inflator apparatus or, more specifically, of the dissociative chamber thereof. Alternatively or in addition, an inert gas, such as argon and helium, for example, as well as materials such as nitrogen and carbon dioxide which are essentially inert under such processing conditions or various combinations thereof can be included such as to supplement the gas produced or formed upon the dissociation of the nitrous oxide.

Fluid chamber contents composed of about 50 mole percent nitrous oxide, about 40 mole percent carbon dioxide and about 10 mole percent helium is one specific example of a gas source material combination for use in the practice of the invention.

The chamber 14 is defined, at least in part, by an elongated generally cylindrical sleeve 16. The sleeve 16 may include a fill port (not shown), as is known in the art, wherethrough materials can be passed into the chamber 14. The sleeve 16 has a first end 20 and a second end 22. The first end 20 is closed such as by means of an end wall 24. The first end wall 24 has a face 26 which faces inwards, towards the chamber 14. Near or adjacent the end wall face 26 there is disposed an indirect ignition charge holder 30. The indirect ignition charge holder 30 may desirably be at least partially formed by or include a cylindrical or cup-shaped member 32 such as may serve to contain or hold a supply of ignition material, designated by the reference numeral 34, and such as to form an ignition charge, designated by the reference numeral 36 and sometimes referred to hereinafter as an "indirect ignition charge." In accordance with certain preferred embodiments of the invention, the charge holder 30 can, as shown, be at least partially and preferably totally contained within the fluid storage chamber 14.

Those skilled in the art and guided by the teachings herein provided will appreciate that the invention can desirably be practiced with various suitable ignition materials forming or included in such indirect ignition charge. Suitable ignition materials for use in the practice of the invention may include, but are not necessarily limited to the $BKNO_3$ family of igniters, the Mg/Al family of igniters, and the Mg family of igniters as well as one or more igniter materials such as zirconium, titanium and titanium hydride, for example, with one or more oxidizers such as one or more alkali metal or alkaline earth metal nitrates or alkali metal perchlorates, for example. In particular, the $BKNO_3$ family of igniters typically contain or include boron (B) and potassium nitrate ($KNO_3$). The Mg/Al family of igniters typically contain or include magnesium and aluminum alloy containing from about 20 to about 50 weight percent magnesium along with one or more alkali metal nitrate (e.g., $Sr(NO_3)_2$), alkaline earth metal nitrate (e.g., $KNO_3$) and/or alkali metal perchlorate (e.g., $KClO_4$ and $NaClO_4$). The Mg family of igniters typically contain or include magnesium along with one or more alkali metal nitrate (e.g., $Sr(NO_3)_2$), alkaline earth metal nitrate (e.g., $KNO_3$) and/or alkali metal perchlorate (e.g., $KClO_4$ and $NaClO_4$). In addition, #8 CAP sensitive materials may provide suitably pressure sensitive igniter materials for use in the practice of the invention.

In addition, suitable ignition materials used in the practice of the invention may desirably contain or include one or more suitable gas producing fuels components. Suitable fuel materials which may desirably be included in or with an ignition material, as described above, include guanidine nitrate, guanylurea nitrate, tetrazoles and bitetrazoles, as well as salts and other derivatives tetrazole and bitetrazole, for example.

Suitable ignition materials used in the practice of the invention may also desirably contain or include one or more binder materials such as in the form of various organic or inorganic polymers known for use in ignition compositions.

In accordance with certain preferred embodiments of the invention and as shown, the indirect ignition charge holder 30 may additionally contain, include or have joined thereto a seal barrier 40, such as in the form or having the construction of a metal disk or foil, for example. As will be appreciated by those skilled in the art and guided by the teachings herein provided, while the inflator assembly 10 is in a "static" state or what may be termed its normal state prior to actuation, the supply of the ignition material 34 can desirably be held, retained or otherwise positioned within the indirect ignition charge holder 30 through the inclusion of such a seal barrier 40. It is to be understood, however, that the broader practice of the invention does not require the inclusion or use of such seal barriers. Thus, if desired, the invention can be suitably practiced without the inclusion or use of such seal barriers.

The sleeve second end 22 is partially closed by a base wall 42. The base wall 42 includes an opening 44 therein, wherethrough a chamber opener 46, such as described in greater detail below, is attached in sealing relation. As will be appreciated, such attachment can be effected by various appropriate means such as with a weld, crimp or other suitable seal, for example. As shown, the ignition charge 36 is physically remote from the chamber opener 46 as, for example, the ignition charge 36 is generally disposed near or adjacent the first end wall 24 while the chamber opener 46 is generally disposed near or adjacent the second end wall 42, where the first and second end walls 24 and 42, respectively, are generally separated or spaced apart by the elongated length of the cylindrical sleeve 16.

The inflator assembly 10 also includes a diffuser assembly 50, such as formed or included along or in the vicinity of the sleeve second end 22. The diffuser assembly 50 includes a plurality of outlet openings 52 such as formed in the cylindrical sleeve 16 generally adjacent or near the sleeve second end 22. Thus, the inflator assembly 10 generally dispenses inflation gas in a reverse flow manner, as described above. The diffuser outlet openings 52 permit the inflation gas from the inflator assembly 10 to be properly dispensed into the associated occupant restraint, such as in a manner known in the art. Those skilled in the art and guided by the teachings herein provided will appreciate that in such inflator assemblies in accordance with the invention such a diffuser assembly can be integral (i.e., formed continuous with and in one piece) with the sleeve 16, as shown, or, if desired or preferred, joined or attached thereto in an appropriate manner, such as by an inertial weld.

The contents of the chamber 14 are normally kept separated from the diffuser assembly 50 and contained within the chamber 14 through the inclusion of a selected sealing means, e.g., by means of a burst disk 54, in sealing relationship therebetween.

In accordance with a preferred embodiment of the invention, the chamber opener 46 is actuatable to produce a discharge effective to open the fluid storage chamber 14 and release therefrom a quantity of inflation gas derived from at least a portion of the gas source material 15. Further, the chamber opener 46, though spaced apart from the ignition charge 36 and not in direct ignition contact therewith, is in indirect ignition contact therewith. In particular embodiments of the invention, the chamber opener 46 forms, produces or results in a discharge such as in the form of a shock wave, other pressure disturbance or the like to result in ignition of at least a portion of the indirect ignition charge 36.

In the embodiment illustrated in FIG. 1, the chamber opener 46 includes an initiator 60 and an adjacent housing 62 containing a supply of a pyrotechnic material, designated by the reference numeral 64 and such as known in the art for use in gas generation for airbag cushion inflation. The initiator 60 has a discharge end 66 and the supply of pyrotechnic material 64 can be held, retained or otherwise desirably positioned adjacent thereto within the housing 62 and while the inflator assembly 10 is in a static state prior to actuation, through the inclusion of a seal barrier 70 such as of the type described above relative to the indirect ignition charge holder 30.

Particular initiator devices for use in the practice of the invention can include any suitable type of initiator means including: bridgewire, spark-discharge, heated or exploding wire or foil, through bulkhead (e.g., an initiator which discharges through a bulkhead such as in the form of a metal hermetic seal), for example, and such as may be effective to initiate reaction of an associated pyrotechnic charge.

In operation, such as upon the sensing of a collision, an electrical signal is sent to the chamber opener 46 and, in the illustrated embodiment, more specifically to the initiator device 60. The initiator device 60 functions to initiate reaction of at least a portion of the pyrotechnic load 64 such as to result in the rupture or otherwise opening of the seal baffler 70 such at to direct the discharge therefrom at or to the burst disk 54 and result in the rupture or otherwise opening of the burst disk 54 otherwise closing the storage chamber 14. With the opening of the burst disk 54, some of the contents of the storage chamber 14 are released from containment therein and can exit from the inflator device 10 through the outlet openings 52. Meanwhile, the discharge from the chamber opener 46 serves to indirectly ignite the ignition charge 36. Such indirect ignition is believed attributable to a shock wave generated by or upon the functioning of the chamber opener 46 and which shock wave travels internally within the inflator device 10 along the length thereof. Thus, in such an embodiment, the chamber opener 46 can function, upon actuation, to open the storage chamber 14 prior to the ignition of the indirect ignition charge 36.

Dependent at least in part on the composition of the ignition charge, reaction of the ignition charge 36 typically produces additional heat with or without a significant increase in gaseous materials. As will be appreciated, such additional heat may desirably serve to cause or result in further or increased heating of or reaction by the gas source material 15 remaining within the storage chamber 14. As will be appreciated, where the contents of the fluid storage chamber 14 include an inert or unreactive fluid material such as argon, helium, carbon dioxide and mixtures thereof, for example, such increased heating can desirably result in further or increased volume expansion. Where the contents of the fluid storage chamber 14 include a dissociative material, such as nitrous oxide, for example, such increased heating can desirably result in increased dissociation, e.g., more or a large relative amount of the stored nitrous oxide will undergo dissociation, as well as further or increased volumetric gas expansion.

Where reaction of the ignition charge 36 produces or results in a significant increase in gaseous materials, such additional gaseous materials can be, as may be desired, also employed in the inflation process.

As identified above, the invention can, if desired, be practiced without requiring the presence or inclusion of a seal barrier on the indirect ignition charge holder 30. However, it has been found that practice of the invention can at least at times be facilitated or improved through the inclusion of a seal barrier, such as the seal barrier 40 in the above described embodiment. In particular, it is believed that the presence of such a seal barrier can assist or facilitate in the subsequent indirect ignition of the ignition material contained therebehind. While the mechanism by which such ignition assistance is achieved is not currently fully understood, it is believed that the presence or inclusion of such a seal barrier may desirably serve to focus or transmit the shock wave to the ignition material contained therebehind such as by directly impacting thereagainst.

While the invention has been described above relative to an embodiment employing a chamber opener composed of an initiator and an associated supply of pyrotechnic material, it is to be understood that the broader practice of the invention is not necessarily so limited. For example, in accordance with other preferred embodiments of the invention, a chamber opener which includes and/or relies on a mechanical means of opening as associated chamber can be used.

Figure 2:
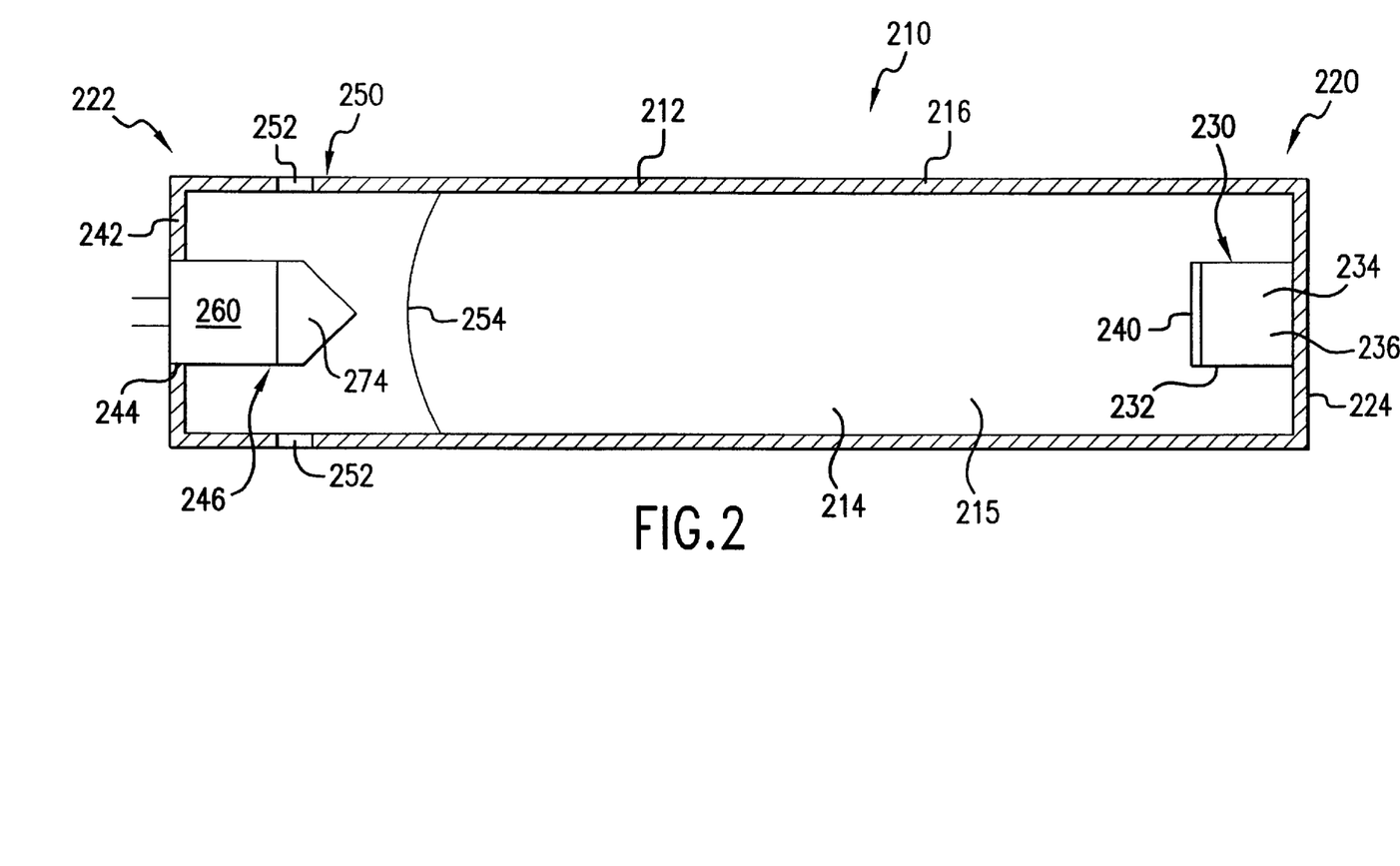
FIG. 2 is a simplified, partially in section, schematic drawing of an airbag inflator in accordance with an alternative embodiment of the invention.

FIG. 2 illustrates one such inflator assembly, generally designated by the reference numeral 210. The inflator assembly 210 is generally similar to the inflator assembly 10, described above. In particular, the inflator assembly 210 comprises a pressure vessel 212 which includes an elongated chamber 214 that contains a fluid load similar to that described above and here designated by the reference numeral 215.

The chamber 214 is defined, at least in part, by an elongated generally cylindrical sleeve 216. The sleeve 216 has a first end 220 and a second end 222. The first end 220 is closed such as by means of an end wall 224. Near or adjacent the first end wall 224 there is disposed an indirect ignition charge holder 230 such as formed by or including a cylindrical or cup-shaped member 232 and such as may serve to contain or hold a supply of ignition material, such as described above and such as designated by the reference numeral 234, and such as to form an ignition charge, designated by the reference numeral 236. The indirect ignition charge holder 230 may additionally contain, include or have joined thereto a seal barrier 240, such as also described above.

The sleeve second end 222 is partially closed by a base wall 242. The base wall 242 includes an opening 244 therein, wherethrough a chamber opener 246 is attached. As detailed below, it is with respect to the chamber opener 246 that the inflator assembly 210 differs primarily from the inflator assembly 10.

As with the inflator assembly 10, the inflator assembly 210 includes a diffuser assembly 250, such as formed or included along or in the vicinity of the sleeve second end 222. The diffuser assembly 250 includes a plurality of outlet openings 252 such as formed in the cylindrical sleeve 216 generally adjacent or near the sleeve second end 222. Thus, the inflator assembly 210 similarly generally dispenses inflation gas in a reverse flow manner, as described above.

Also similar to the inflator assembly 10, the contents of the chamber 214 are normally kept separated from the diffuser assembly 250 and contained within the chamber 214 through the inclusion of a selected sealing means, e.g., by means of a burst disk 254, in sealing relationship therebetween.

As identified above, it is with respect to the chamber opener 246 that the inflator assembly 210 differs primarily from the inflator assembly 10. In particular, whereas the inflator assembly 10 employed a chamber opener 46 which included an initiator and an associated supply of a pyrotechnic material to effect rupture or opening of the associated burst disk, the inflator assembly 210 employs a chamber opener 246 which includes an initiator device 260 and an associated mechanical opener 274, such as having the form of a projectile.

In operation, such as upon the sensing of a collision, an electrical signal is sent to the chamber opener 246 and, in the illustrated embodiment, more specifically to the initiator device 260. The initiator device 260 functions to launch or release the mechanical opener 274 such as to result in the rupture or otherwise opening of the burst disk 254 otherwise closing the storage chamber 214. With the opening of the burst disk 254, some of the contents of the storage chamber 214 are released from containment therein and can exit from the inflator device 210 through the outlet openings 252. Meanwhile, the discharge from the chamber opener 246 serves to indirectly ignite the ignition charge 236 such as via shock wave propagation through the inflator assembly 210. Again, dependent at least in part on the composition of the ignition charge, reaction of the ignition charge 236 typically produces additional heat with or without a significant increase in gaseous materials, as described above.

Figure 3:
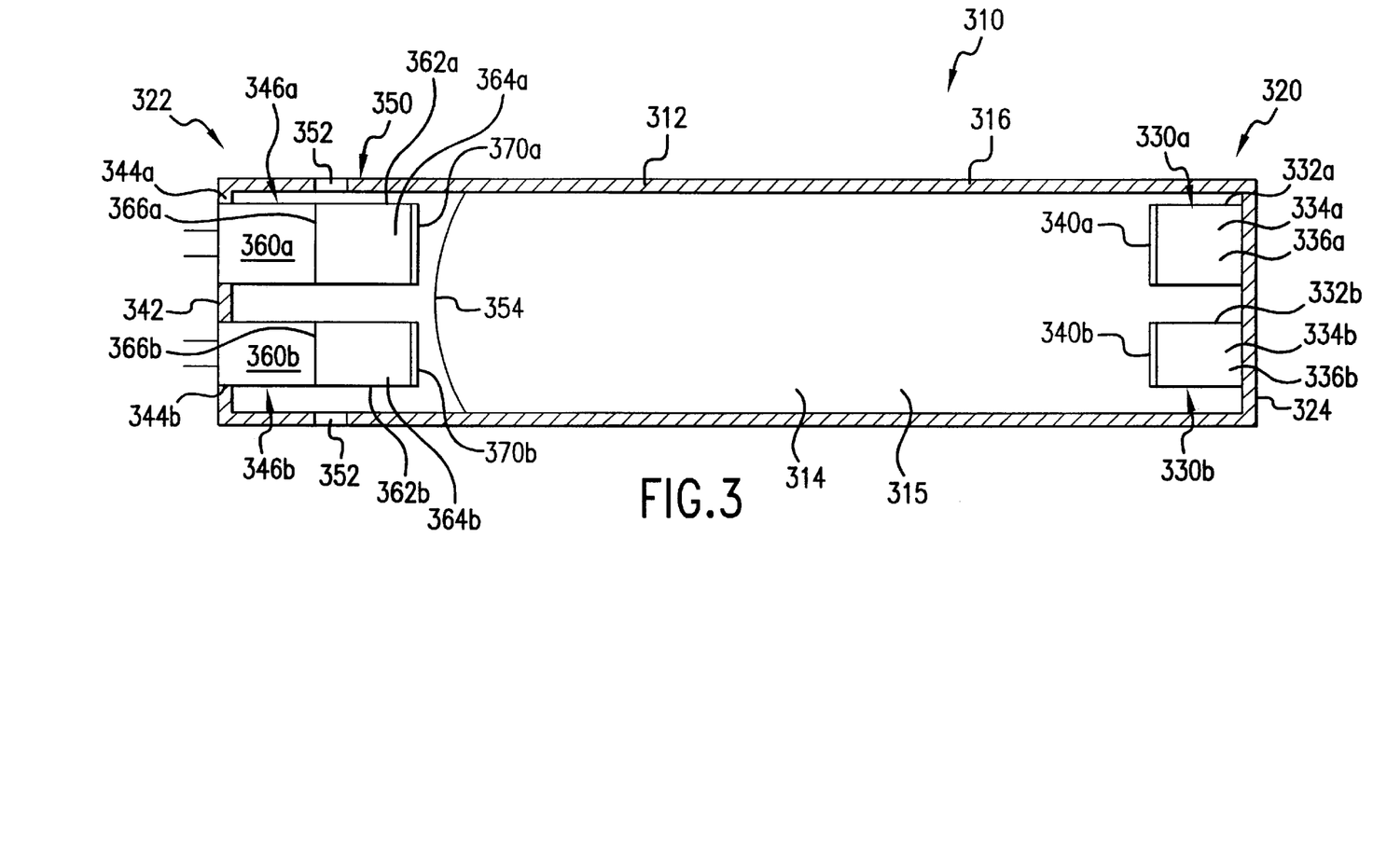
FIG. 3 is a simplified, partially in section, schematic drawing of an airbag inflator in accordance with another alternative embodiment of the invention.

While the invention has been described above relative to inflator assembly embodiments employing a single indirect ignition charge, those skilled in the art and guided by the teachings herein provided will appreciate that the broader practice of the invention is not necessarily so limited. For example, FIG. 3 illustrates an inflator assembly, generally designated by the reference numeral 310, and in accord with one such embodiment wherein the inflator assembly includes or contains two indirect ignition charges.

The inflator assembly 310 is generally similar to the inflator assembly 10, described above. In particular, the inflator assembly 310 comprises a pressure vessel 312 which includes an elongated chamber 314 that contains a fluid load similar to that described above and here designated by the reference numeral 315.

The chamber 314 is defined, at least in part, by an elongated generally cylindrical sleeve 316. The sleeve 316 has a first end 320 and a second end 322. The first end 320 is closed such as by means of an end wall 324. Near or adjacent the first end wall 324 there is disposed a first indirect ignition charge holder 330a and a second indirect ignition charge holder 330b, such as each formed by or including a cylindrical or cup-shaped member 332a and 332b, respectively, and such as may serve to contain or hold a supply of ignition material, such as described above and such as designated by the reference designations 334a and 334b, respectively, and such as to form an ignition charge, identified by the reference designations 336a and 336b, respectively. Each of the indirect ignition charge holders 330a and 330b each additionally contain, include or have joined thereto a seal barrier 340a and 340b, respectively, such as also described above.

As will be appreciated by those skilled in the art and guided by the teachings herein provided, the seal barriers can be appropriately designed, such as by varying the thickness thereof, such that application of a different pressure or force thereagainst is required to produce or result in the rupture or opening thereof and the indirect ignition of the ignition material contained therebehind. Further, each of the first and second supplies of ignition material 334a and 334b can differ in one or more parameters such as type, form, composition and amount of ignition material and such as may serve to provide or result in different amounts or rates of heat output, gas output, or a combination thereof. Thus, through the appropriate inclusion of first and second supplies of ignition material 334a and 334b, a wide variety or range of inflation fluid production or supply criteria or conditions can be satisfied through the practice of the present invention. In particular, through the appropriate selection of the ignition materials 334a and 334b and the proper ignition thereof, the inflation gas providing characteristics of the inflator assembly 310 can be appropriately selected to meet specific crash protection requirements.

The sleeve second end 322 is partially closed by a base wall 342. The base wall 342 includes a pair of openings 344a and 344b, respectively, wherethrough a respective chamber opener 346a and 346b, such as described above, is attached.

As with the inflator assembly 10, the inflator assembly 310 includes a diffuser assembly 350, such as formed or included along or in the vicinity of the sleeve second end 322. The diffuser assembly 350 includes a plurality of outlet openings 352 such as formed in the cylindrical sleeve 316 generally adjacent or near the sleeve second end 322. Thus, the inflator assembly 310 similarly generally dispenses inflation gas in a reverse flow manner, as described above.

Also similar to the inflator assembly 10, the contents of the chamber 314 are normally kept separated from the diffuser assembly 350 and contained within the chamber 314 through the inclusion of a selected sealing means, e.g., by means of a burst disk 354, in sealing relationship therebetween.

Similar to the chamber opener 46, described above, each of the chamber openers 346a and 346b includes an initiator 360a and 360b, respectively, and an adjacent housing 362a and 362b containing a supply of a pyrotechnic material, designated by the reference numeral 364a and 364b, respectively, and such as known in the art for use in gas generation for airbag cushion inflation. In the illustrated embodiment, the chamber openers 346a and 346b are desirably designed such as by each containing a selected type, form, composition and amount of pyrotechnic material such that each of the openers yields a different indirect ignition causing output and such as may effect the indirect ignition of a selected one of the supplies of ignition material 334a and 334b. As will be appreciated, a wide range of operating or performance criteria can be satisfied through an appropriately designed inflator assembly in accordance with the invention and the invention is not necessarily limited to the specific embodiments herein described and illustrated. For example, through the incorporation of proper controls, a single chamber opener can desirably be utilized to effect the selective indirect ignition of either or both such indirect ignition charges.

Returning to FIG. 3, the initiators 360a and 360b each have a discharge end 366a and 366b, respectively, and the supply of pyrotechnic material 364a and 364b can be held, retained or otherwise desirably positioned adjacent thereto within the respective housing 362a and 362b while the inflator assembly 310 is in a static state prior to actuation, through the inclusion of a seal barrier 370a and 370b, respectively, as described above. A control unit, such as known in the art and not here shown, can be joined or otherwise in control communication with the chamber openers 346a and 346b to effect the desired actuation thereof such as dependent on one or more crash and occupant conditions.

In operation, such as upon the sensing of a collision, an electrical signal is sent from a control unit to a selected one or both of the chamber openers 346a and 346b, more specifically to the respective initiator device 360a and 360b. The initiator device functions to initiate reaction of at least a portion of the respective pyrotechnic load 364a, 364b such as to result in the rupture or otherwise opening of the respective seal barrier 370a, 370b and subsequent rupture or opening of the burst disk 354 otherwise closing the storage chamber 314. With the opening of the burst disk 354, some of the contents of the storage chamber 314 are released from containment therein and can exit from the inflator device 310 through the outlet openings 352.

Meanwhile, the discharge from the chamber opener selected for actuation serves to indirectly ignite the corresponding or associated indirect ignition charge. As described above, reaction of the ignition charge typically produces additional heat with or without a significant increase gaseous materials. The additional heat may desirably serve to cause or result in further or increased heating of or reaction by the gas source material 315 remaining within the storage chamber 314. Where reaction of the ignition charge produces or results in a significant increase in gaseous materials, such additional gaseous materials can be, as may be desired, also employed in the inflation process.

Figure 4:
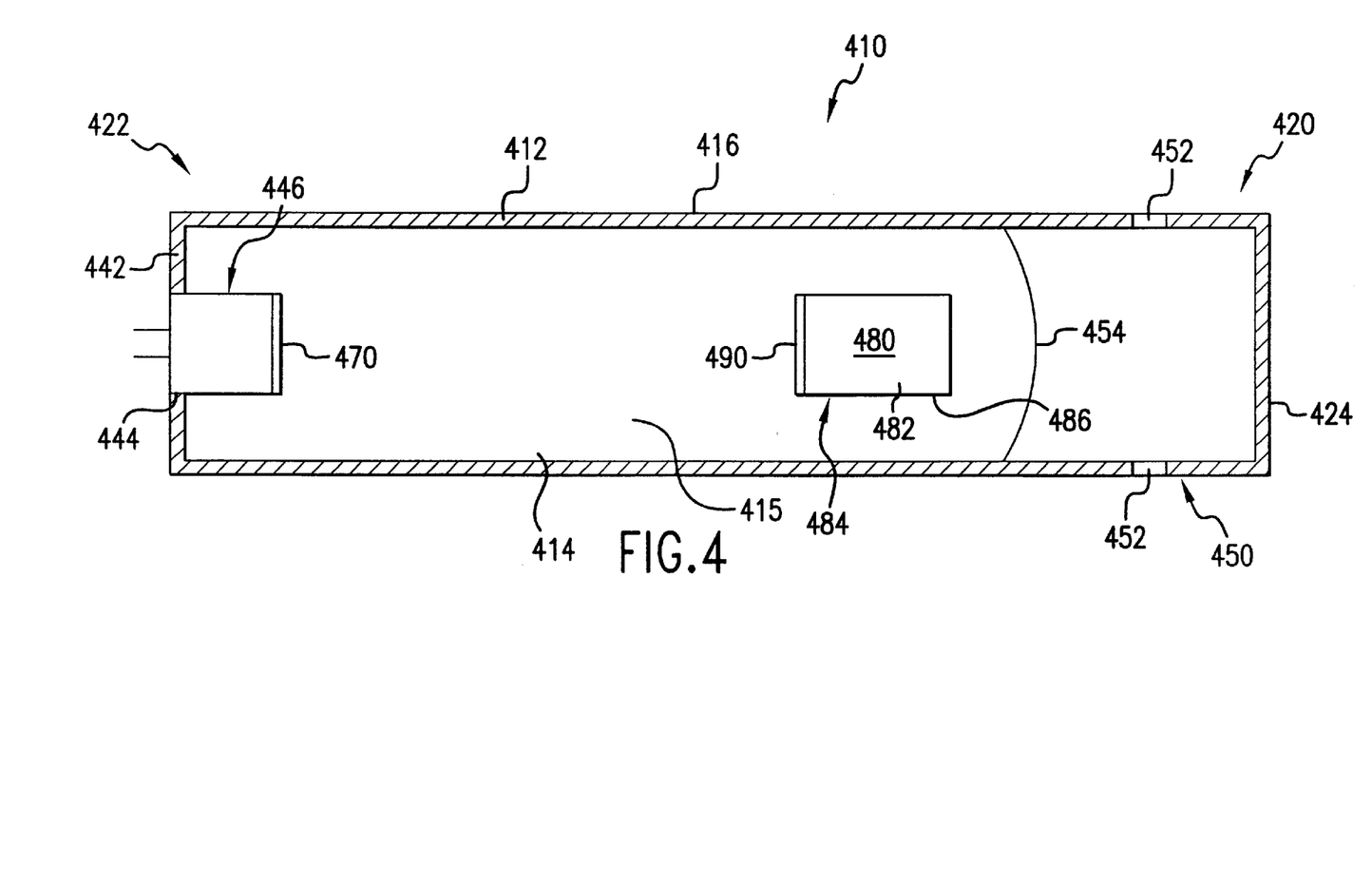
FIG. 4 is a simplified, partially in section, schematic drawing of an airbag inflator in accordance with yet still another alternative embodiment of the invention.

While the invention has been described above relative to inflator assembly embodiments in the nature of reverse flow inflators, the broader practice of the invention is not necessarily so limited. For example, FIG. 4 illustrates a blow down form of inflator assembly in general accord with the invention and generally designated by the reference numeral 410. The inflator assembly 410 comprises a pressure vessel 412 which includes an elongated chamber 414 that contains a fluid load similar to that described above and here designated by the reference numeral 415.

The chamber 414 is defined, at least in part, by an elongated generally cylindrical sleeve 416. The sleeve 416 has a first end 420 and a second end 422. The first end 420 is closed such as by means of an end wall 424. The sleeve second end 422 is partially closed by a base wall 442. The base wall 442 includes an opening 444 therein, wherethrough a chamber opener 446, such as described above, is attached. The chamber opener 446 may desirably include an initiator device and an associated pyrotechnic load sealed therewithin through the aid of a seal barrier 470, such as described above.

The inflator assembly 410 includes a diffuser assembly 450. In this embodiment, however, the diffuser assembly 450 is formed or included along or in the vicinity of the sleeve first end 420 rather than the second end 422. The diffuser assembly 450 includes a plurality of outlet openings 452 such as formed in the cylindrical sleeve 416 generally adjacent or near the sleeve first end 420. Thus, the inflator assembly 410 generally dispenses inflation gas in a blow down manner, as described above.

As with the above-described embodiments, the contents of the chamber 414 are normally kept separated from the diffuser assembly 450 and contained within the chamber 414 through the inclusion of a selected sealing means, e.g., by means of a burst disk 454, in sealing relationship therebetween.

The inflator assembly 410 also differs from the above-described inflator assembly embodiments of the invention in that the inflator assembly 410 includes or contains an indirect ignition material, designated by the reference numeral 480, within the fluid storage chamber 414. In particular, the indirect ignition material 480 forms an ignition charge 482 such as held or contained within an indirect ignition charge holder 484, such as formed by a cup-shaped member 486 and a seal barrier 490.

In operation, such as upon the sensing of a collision, an electrical signal is sent to the chamber opener 446. The chamber opener 446 functions such as to initiate reaction of at least a portion of the pyrotechnic load therein contained such as to result in the rupture or otherwise opening of the seal barrier 470. As a result, high temperature combustion products are discharged from the opener into the storage chamber 414 resulting in the heating and, in some cases, reaction of the contents therein contained, as described above.

The rapid rise in pressure within the storage chamber 414 associated with an increase in temperature and in relative amount of gaseous products therein contained, results in the rupture or otherwise opening of the burst disk 454 when the gas pressure within the chamber 414 exceeds the structural capability of the burst disk 454. The opening of the burst disk 454 permits the passage of the inflation gas into the diffuser assembly 450 and subsequently through the outlet openings 452 into an associated airbag assembly.

Further, the chamber opener discharge also produces or results in the indirect ignition of at least a portion of the ignition material 480. As described above, dependent at least in part on the composition of the ignition charge, reaction thereof can typically produce additional heat with or without a significant increase gaseous materials and thus contribute to inflation gas production and assist or aid in the inflation process.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Comparative Example 1 and Example 1

In these tests, a test inflator having the general configuration of the inflator shown in FIG. 1, with a diameter of 30 mm and a length of 280 mm, was used. The fluid storage chamber of the test inflator in both of these tests had contents, in a static or normal state prior to actuation, composed of a 60 gram mixture of 25% nitrous oxide and 75% carbon dioxide (mass basis). The chamber opener in both of these tests was composed of a 260 mg zirconium potassium perchlorate ("ZPP") initiator and an adjacent supply of 1.45 grams of a proprietary pyrotechnic material containing a mixture of strontium nitrate, magnesium, aluminum and a polyacromide binder material.

In Comparative Example 1, the test inflator was operated with a 0 gram load indirect ignition charge. In Example 1, the test inflator was operated with a 0.7 gram load indirect ignition charge composed of the same proprietary pyrotechnic material referred to above. In each case, the respective test inflator was fired into a 60-liter test tank and the pressure within the test tank was measured as a function of time.

Figure 5:
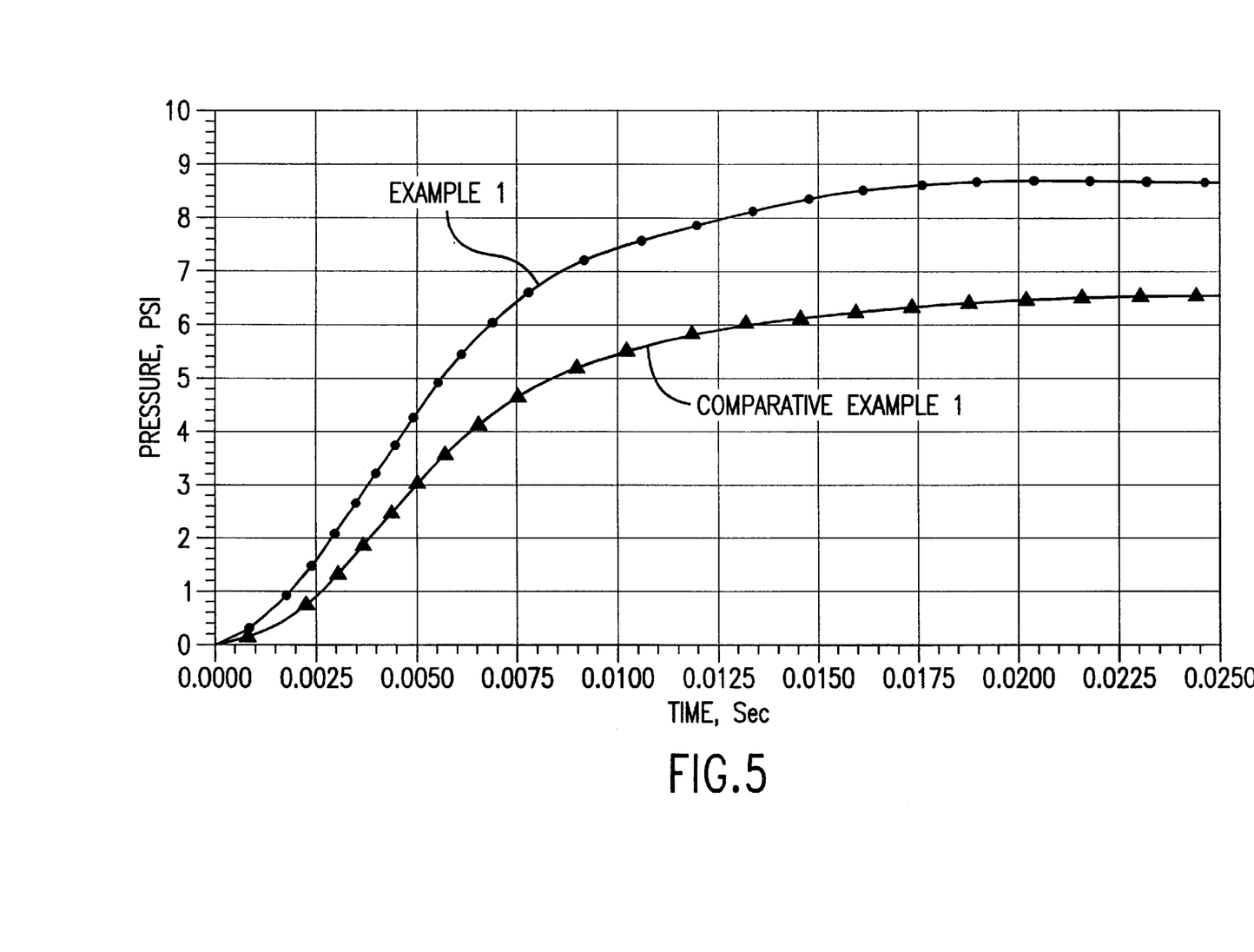
FIG. 5 is a graphical depiction of the tank pressure as a function of time performance realized for the inflator assemblies utilized in Example 1 and Comparative Example 1.

FIG. 5 illustrates the performance realized with the test inflators of Comparative Example 1 and Example 1. More particularly, FIG. 5 is a graphical depiction of tank pressure as a function of time performance realized for the test inflator assemblies utilized in Comparative Example 1 and Example 1, respectively.

Results

As shown in FIG. 5, the inflator of Example 1 achieved a tank pressure differential of about 2 psi as compared to the test inflator of Comparative Example 1. Further, Example 1 exhibited a higher rise rate and a higher tank pressure through the first 25 ms of the inflation event. These increases in performance are attributable to ignition of the indirect ignition charge included in Example 1 and an increased release of heat resulting therefrom, as well as increased dissociation of nitrous oxide originally stored or contained within the fluid storage chamber of the test inflator.

Examples 2 and 3

These examples employed a test inflator similar in design and construction to the test inflator described above and used in Example 1. The only difference between the tests of Examples 2 and 3 was that Example 2 employed a chamber opener composed of a 260 mg ZPP initiator (as in Example 1) while Example 3 employed a chamber opener containing a 90 mg load of ZPP.

Figure 6:
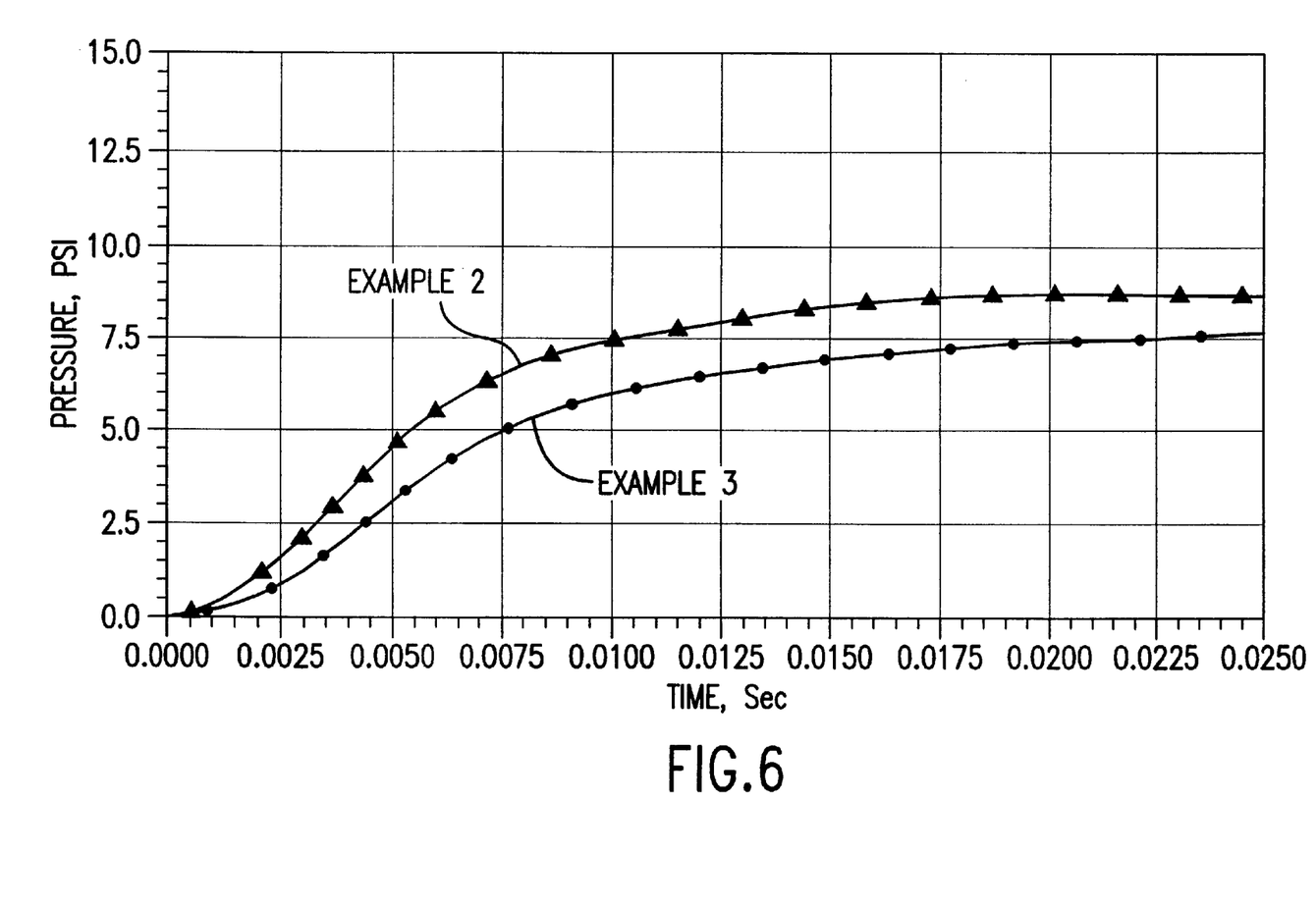
FIGS. 6 and 7 are graphical depictions of the tank pressure as a function of time performance realized for the inflator assemblies utilized in Examples 2 and 3, with FIG. 7 showing an extended time axis.
Figure 7:
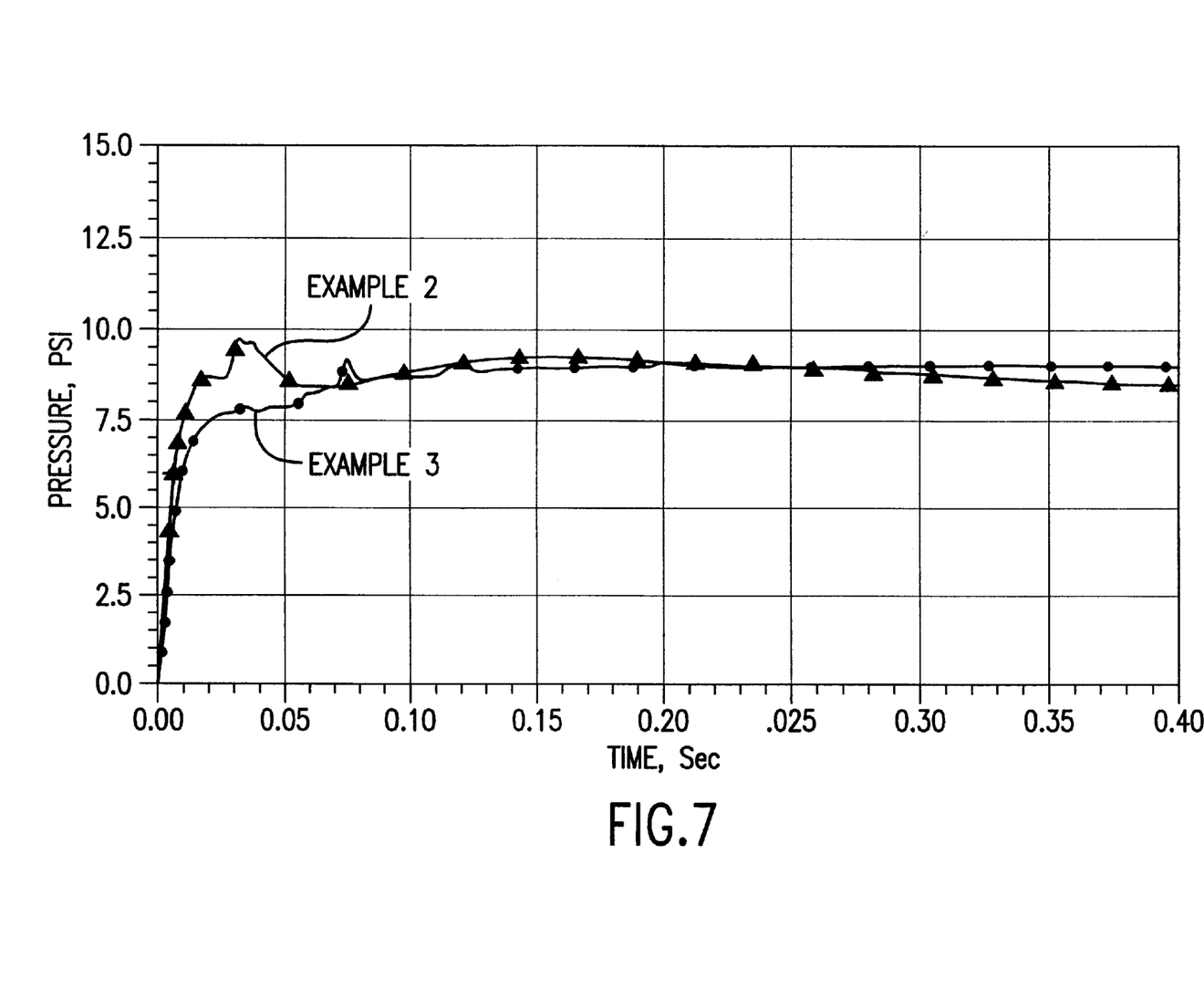

FIGS. 6 and 7 are graphical depictions of tank pressure as a function of time performance realized for the test inflator assemblies utilized in Examples 2 and 3, respectively.

Results

As shown in FIGS. 6 and 7, the test inflators of Examples 2 and 3 achieved the same ultimate maximum tank pressure, with the test inflator of Example 3 doing so with a reduced rise rate. As will be appreciated by those skilled in the art and guided by the teachings herein provided, a reduction in rise rate can be beneficial in at least certain airbag cushion inflation applications. The lower rise rate realized in Example 3 indicates that, through proper design, the rise rate of inflator devices in accordance with the invention can be desirably controlled.

It is to be understood that the discussion of theory, such as the discussion of shock wave propagation, travel or transmission resulting from operation of the chamber opener such as to cause or result in ignition of at least a portion of the indirect ignition charge, for example, is included to assist in the understanding of the subject invention and is in no way limiting to the invention in its broad application.

In view of the above, it will be appreciated that the invention provides inflator devices and methods for supplying inflation gas to an inflatable device in a manner which effectively and efficiently transmits heat to stored gas source material(s) without necessitating undesirably costly design modifications or component inclusions.

In particular, the invention provides inflator devices and methods for supplying inflation gas to an inflatable device which employ an indirect ignition charge within the inflator and which charge can be ignited by an indirect ignition source, such as in the form of a shock wave. In view thereof, significantly higher inflator performances can be realized without necessitating the added expense and design complexity associated with the inclusion of an added initiator device or squib dedicated to initiating such added ignition charge.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for inflating an inflatable device, the apparatus comprising:
a fluid storage chamber having contents, in a static state, including a supply of at least one gas source material, the at least one gas source material having a fluid form;
a chamber opener effective, upon actuation, to open the fluid storage chamber and release therefrom a quantity of inflation gas derived from at least a portion of the at least one gas source material; and
a first indirect ignition charge including at least one first ignition material physically remote from the chamber opener and in indirect ignition contact with the chamber opener upon acutation of the chamber opener;
wherein actuation of the chamber opener results in subsequent indirect ignition of at least a portion of the first indirect ignition charge to produce a quantity of heat and wherein at least a portion of the quantity of heat is transmitted to the contents of the fluid storage chamber;
wherein the apparatus is free of a mechanical chamber opener.

2. The apparatus of claim 1 wherein the static state contents of the fluid storage chamber comprise at least one liquified gas material.

3. The apparatus of claim 2 wherein the liquified gas material is nitrous oxide.

4. The apparatus of claim 3 wherein the static state contents of the fluid storage chamber additionally comprise liquified carbon dioxide.

5. The apparatus of claim 1 wherein the static state contents of the fluid storage chamber comprise at least one gaseous material.

6. The apparatus of claim 1 wherein the static state contents of the fluid storage chamber comprise at least one gaseous material selected from the group consisting of argon, helium, nitrous oxide, carbon dioxide and combinations thereof.

7. The apparatus of claim 1 wherein the chamber opener comprises an initiator in combination with a first pyrotechnic material.

8. The apparatus of claim 1 wherein the chamber opener comprises a mechanical chamber opener.

9. The apparatus of claim 1 additionally comprising an indirect ignition charge holder containing the at least one first ignition material, the indirect ignition charge holder including a seal barrier, in the static state, sealing the first ignition material from contact with the fluid chamber contents.

10. The apparatus of claim 9 wherein the indirect ignition charge holder is at least partially contained within the fluid storage chamber.

11. The apparatus of claim 10 wherein the indirect ignition charge holder is totally contained within the fluid storage chamber.

12. The apparatus of claim 1 wherein the indirect ignition of at least a portion of the first indirect ignition charge additionally produces a quantity of gas to supplement the inflation gas derived from at least a portion of the at least one gas source material.

13. The apparatus of claim 1 wherein the chamber opener is effective, upon actuation, to open the fluid storage chamber prior to ignition of the indirect ignition charge.

14. The apparatus of claim 1 wherein the indirect ignition charge is at least partially contained within the fluid storage chamber.

15. The apparatus of claim 1 wherein the chamber opener is free of a projectile.

16. An apparatus for inflating an inflatable device, the apparatus comprising:
a fluid storage chamber having contents, in a static state, including a supply of at least one gas source material, the at least one gas source material having a fluid form;
a chamber opener effective, upon actuation, to open the fluid storage chamber and release therefrom a quantity of inflation gas derived from at least a portion of the at least one gas source material; and
a first indirect ignition charge including at least one first ignition material physically remote from the chamber opener and in indirect ignition contact therewith;
wherein actuation of the chamber opener results in subsequent indirect ignition of at least a portion of the first indirect ignition charge to produce a quantity of heat and wherein at least a portion of the quantity of heat is transmitted to the contents of the fluid storage chamber;
the apparatus additionally comprising a second indirect ignition charge including at least one second ignition material physically remote from the chamber opener and in indirect ignition contact therewith, wherein actuation of the chamber opener results in subsequent indirect ignition of at least a portion of the second indirect ignition charge to produce a second quantity of heat and at least a portion of the second quantity of heat is transmitted to the contents of the fluid storage chamber.

17. The apparatus of claim 16 wherein the first and second indirect ignition charges differ from one another in at least one manner selected from the group consisting of heat output, gas output and combinations thereof.

18. A method of supplying a quantity of inflation gas to an inflatable device via an apparatus which includes a fluid storage chamber, a chamber opener, and at least one indirect ignition charge, the fluid storage chamber having contents, in a static state, including a supply of at least one gas source material, the at least one gas source material having a fluid form, the method comprising:
actuating said chamber opener and indirectly igniting at least a portion of the at least one indirect ignition charge to produce heat to heat at least a portion of the supply of the at least one gas source material;
wherein the actuating of the chamber opener results in opening of the fluid storage chamber by non-mechanical means.

19. The method of claim 18 wherein the actuating of the chamber opener results in opening of the fluid storage chamber and fluid communication between the fluid storage chamber and the inflatable device.

20. The method of claim 19 additionally comprising:
releasing from the fluid storage chamber a quantity of inflation gas derived from at least a portion of the at least one gas source material prior to the indirect ignition of at least a portion of the at least one indirect ignition charge.

21. The method of claim 18 wherein the static state contents of the fluid storage chamber include at least one liquified gas material.

22. The method of claim 21 wherein the liquified gas material is nitrous oxide.

23. The method of claim 22 wherein the static state contents of the fluid storage chamber additionally include liquified carbon dioxide.

24. The method of claim 18 wherein the static state contents of the fluid storage chamber include at least one gaseous material.

25. The method of claim 18 wherein the static state contents of the fluid storage chamber comprise at least one gaseous material selected from the group consisting of argon, helium, nitrous oxide, carbon dioxide and combinations thereof.

26. The method of claim 18 wherein the indirect ignition of the at least one indirect ignition charge comprises rupturing a seal barrier normally preventing contact between the first ignition material and the fluid chamber contents.

27. The method of claim 18 wherein the indirect ignition of at least a portion of the first indirect ignition charge additionally produces a quantity of gas supplementing the inflation gas derived from at least a portion of the at least one gas source material.

28. The method of claim 18 wherein the actuating of the chamber opener results in ignition of at least a portion of the first indirect ignition charge prior to opening of the fluid storage chamber and fluid communication between the fluid storage chamber and the inflatable device.

29. The method of claim 18 wherein the actuating of the chamber opener results in opening of the fluid storage chamber by non-projectile means.

* * * * *